US008126468B2

(12) United States Patent
Chang et al.

(10) Patent No.: US 8,126,468 B2
(45) Date of Patent: Feb. 28, 2012

(54) APPARATUS, SYSTEM AND METHOD FOR PRIORITY CALL MANAGEMENT

(75) Inventors: Henry Chang, San Diego, CA (US); Doug Dunn, Chula Vista, CA (US); Amit Kalhan, La Jolla, CA (US)

(73) Assignee: Kyocera Corporation, Kyoto (JP)

( * ) Notice: Subject to any disclaimer, the term of this patent is extended or adjusted under 35 U.S.C. 154(b) by 1349 days.

(21) Appl. No.: 11/388,578

(22) Filed: Mar. 24, 2006

(65) Prior Publication Data

US 2007/0225012 A1    Sep. 27, 2007

(51) Int. Cl.
*H04W 40/00* (2009.01)
(52) U.S. Cl. .................. 455/445; 455/442; 455/448
(58) Field of Classification Search .............. 455/445, 455/452.2, 453, 552.1, 448, 444
See application file for complete search history.

(56) References Cited

U.S. PATENT DOCUMENTS

| 6,061,559 | A * | 5/2000 | Eriksson et al. ........... 455/435.3 |
| 6,148,210 | A * | 11/2000 | Elwin et al. .................... 455/453 |
| 6,456,858 | B1 * | 9/2002 | Streter ....................... 455/552.1 |
| 6,882,640 | B1 * | 4/2005 | Berger et al. ................. 370/353 |
| 7,203,163 | B1 * | 4/2007 | Hundscheidt et al. ........ 370/230 |
| 2002/0131397 | A1 | 9/2002 | Patel et al. |
| 2003/0220108 | A1 | 11/2003 | Kojima et al. |
| 2004/0121777 | A1 | 6/2004 | Scwarz et al. |
| 2007/0047478 | A1 * | 3/2007 | Balachandran et al. ...... 370/328 |

FOREIGN PATENT DOCUMENTS

WO    WO 98/31180 A1    7/1998

OTHER PUBLICATIONS

3GPP, Digital cellular telecommunications system (Phase 2+); Universal Mobile Telecommunications System (UMTS); Recommended infrastructure measures to overcome specific Mobile Station (MS) and User Equipment (UE) faults (3GPP TR 29.994 version 6.0.0 Release 6) (Sep. 2004) ETSI TR 129 994, vol. 3-CN1, No. V600.
3GPP, Digital cellular telecommunications system (Phase 2+); Universal Mobile Telecommunications System (UMTS); Enhanced Multilevel Precedence and Pre-emption Service (eMLPP); Stage 2, (3GPP TS 23.067 version 6.1.0 Release 6) (Mar. 2005) ETSI TS 123 067, vol. 3-CN4, No. V610.
Kyriazakos, et al., "Enchanced Capacity Management for 2nd and 3rd Generation Cellular Networks", VTC (2000) Fall, IEEE VTS 52nd, Vehicular Technology Conference, Boston, MA, (Sep. 24-28, 2000) vol. 6 of 6, Conf. 52, pp. 2701-2705, XP001033028.

* cited by examiner

*Primary Examiner* — Olumide T Ajibade Akonai
*Assistant Examiner* — Jaime Holliday

(57) ABSTRACT

In response to detecting a call attempt for a priority call on the originating wireless network by an initiating access terminal, at least one active call having a priority level less than the priority call is transferred to an alternate technology wireless network. If a call attempt is placed when a transfer threshold has been exceeded, candidate transferring terminals are identified based on multi-mode capabilities and network conditions. One or more of the candidate transferring terminals engaged in calls that have a priority level less than the priority call are transferred from the originating wireless network to the alternate technology wireless network when the transfer threshold is exceeded.

20 Claims, 3 Drawing Sheets

APPARATUS, SYSTEM AND METHOD FOR PRIORITY CALL MANAGEMENT

FIELD OF THE INVENTION

The invention relates in general to wireless communication systems and, more specifically, to an apparatus, system, and method for managing wireless communication networks in accordance with priority levels.

BACKGROUND OF THE INVENTION

Wireless communication systems typically provide communication services to numerous user devices within a geographical service area. Due to capacity constraints and network resources, the number of user devices that can be serviced within a geographical area is limited. Accordingly, during high communication traffic, it is possible that some users may not be able to access wireless service. In order to more efficiently manage wireless access resources, some proposed management schemes include providing wireless service in accordance with a priority level of the call. Although this technique is useful in assigning resources, some calls may not be completed during exceptionally high traffic. This problem is aggravated during emergency situations where several users may wish to place calls at the same time and when it is important to complete emergency calls.

Accordingly, there is need for an apparatus, system and method for managing wireless communication networks during high communication traffic.

SUMMARY OF THE INVENTION

In response to detecting a call attempt for a priority call on the originating wireless network by a priority call initiating access terminal, at least one active call having a priority level less than the priority call is transferred to an alternate technology wireless network. If a call attempt is placed when a transfer threshold has been exceeded, candidate transferring terminals are identified based on their multi-mode capabilities and current network conditions. One or more of the candidate transferring terminals engaged in calls that have a priority level less than the priority call are transferred from the originating wireless network to the alternate technology wireless network when the transfer threshold is exceeded.

DETAILED DESCRIPTION

Figure 1:
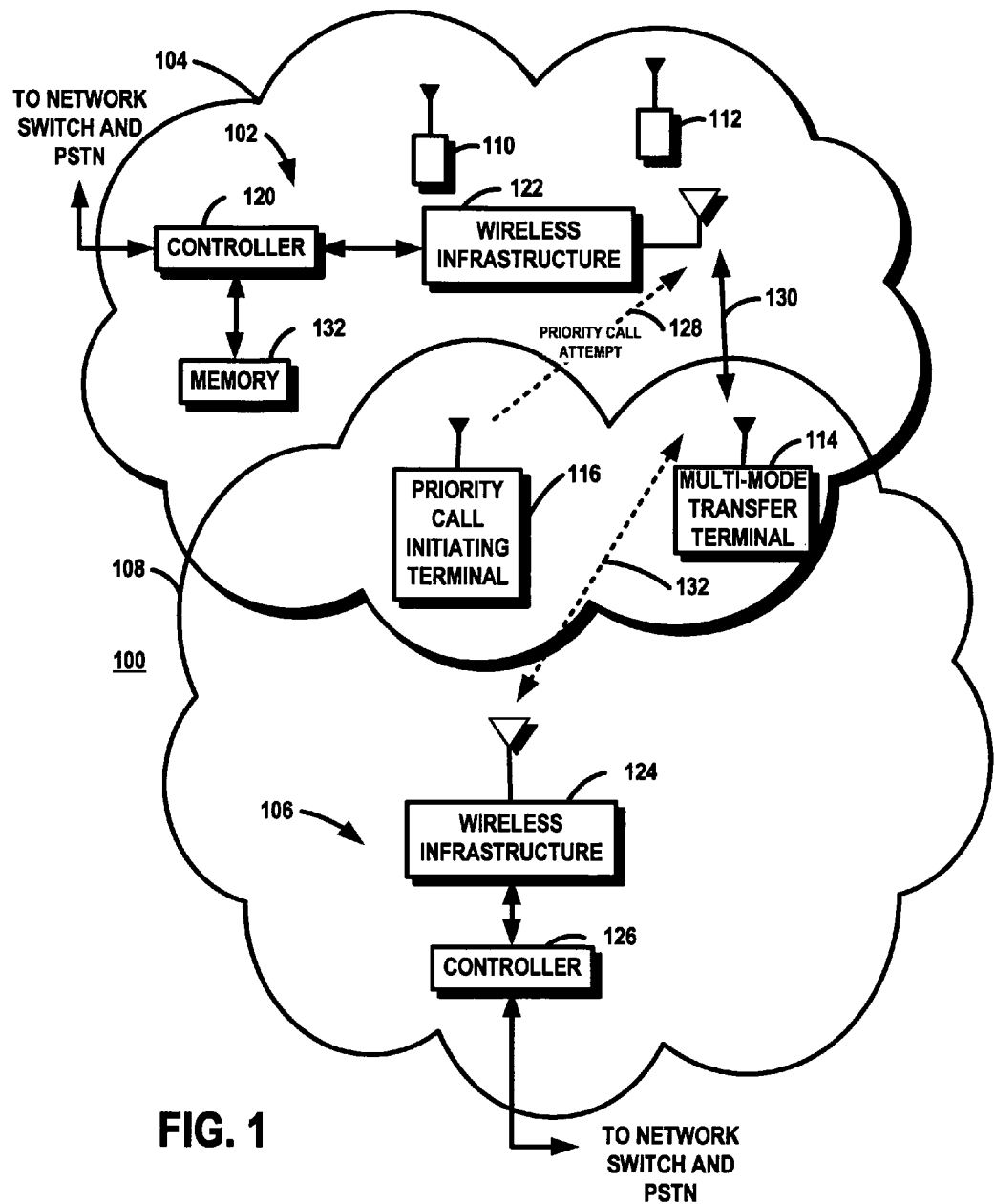
FIG. 1 is a block diagram of a communication system in accordance with an exemplary embodiment of the invention.

FIG. 1 is a block diagram of a communication system 100 in accordance with an exemplary embodiment of the invention. An originating wireless network provides wireless services to a plurality of access terminals 110, 112, 114, 116 within a geographic region 104. At least one alternate technology wireless network 106 provides wireless service to a geographical region 108 that includes at least a portion of the geographical region 104 serviced by the originating wireless network 102. The wireless networks 102, 106 may be any type of circuit switched or packet data wireless network where the alternate technology network utilizes a different protocol for communication than the originating wireless network. For example, either of the wireless networks 102, 106 may be any of several cellular networks or packet data network such as wireless networks operating in accordance with code division multiple access (CDMA), Global System for Mobile Communications (GSM), WiMax, IEEE802.20, WCDMA, HSDPA or other wireless wide area network (WWAN) protocols or local wireless area network (WLAN). Both the originating wireless network 102 and the alternate technology network 106 may be a cellular network or a packet data network where the protocol utilized by the alternate technology wireless network 106 is different from the protocol of the originating wireless network 102. For example, the originating wireless network may be CDMA network and the alternate technology network may be a GSM network.

In the example depicted in FIG. 1, at least one (114) of the active terminals engaged in wireless communication has multi-mode capabilities and can, therefore, communicate on at least one alternate technology wireless network 106. In accordance with the exemplary embodiment, each active call between an access terminal and the wireless network is characterized by a priority level which is categorized as one of at least two priority levels including a normal priority level and a high priority level. Additional levels may be used in some circumstances. During high communication traffic when a transfer threshold in a service area is reached, one or more active access terminals, referred to as transferring terminals 114, are transferred to one or more alternate technology wireless networks 106 in order to allocate resources to a priority call having a higher priority level than the transferred call(s). A transferring terminal 114 is a multi-mode access terminal engaged in an active normal priority call or attempting to place a normal priority call on the originating wireless network 102 that is transferred to an alternate technology wireless network 106. In the exemplary embodiment, the transfer threshold is based on the capacity of the service area. The transfer threshold may be based on any number of factors, parameters, and measurements. Examples of other suitable parameters include changes in the number of users attempting to access the terminal, the number of total data users on the wireless network, the total number of voice users on the wireless network, and the ratio of data to voice communication traffic. Examples of suitable parameters in CDMA include rise over thermal in the reverse link for CDMA, available transmission power and the number of remaining Walsh codes that can be assigned to access terminals in the forward link. For TDMA based systems, the network parameters include the number of available slots to support new calls.

The originating wireless network includes at least a controller 120 and a wireless infrastructure 122. The controller 120 may be any network device or entity that has the capability to manage the wireless network 102. Examples of controllers 120 include a base station controller (BSC) in a cdma2000 1x network and access network controller (ANC) in WiMax (IEEE 802.16) networks. A memory 132 accessible by the controller 120 provides storage for data and information related to the access terminal capabilities, network conditions and the transfer threshold. The originating wireless network 102 may be connected to a network switch (not shown) that is connected to other wireless networks and/or a public switched telephone network (PSTN). For example, where the originating wireless network 102 is a cdma2000 1x cellular network, the wireless infrastructure 122 includes a base station transceiver (BTS), the controller 120 is a base station controller (BSC), and the network switch is a mobile switching center (MSC). Where the originating wireless network 102 is a WiMax network, the wireless infrastructure 122 includes an access network (AN), the controller 120 is an access network controller (ANC), and the network switch is a packet data service node (PDSN).

When a priority call initiating access terminal 116 initiates a priority call attempt 128 on the originating wireless network 102, the controller 120 determines whether the transfer threshold has been exceeded. If the threshold has been exceeded, the controller 120 identifies candidate transferring terminals 114 that can be transferred to an alternate technology wireless network 106. In the exemplary embodiment, a controller 120 for the service area 104 of the originating wireless network 102 monitors the transfer threshold and identifies at least one access terminal 114 that will be transferred to the alternate technology wireless network 106 when the transfer threshold is exceeded and a priority call attempt 128 is detected. When an access terminal 116 attempts to place a call and the transfer threshold has been exceeded, the controller 120 evaluates the active calls, including the newly attempted call, to identify a candidate transferring terminal 114. If a multi-mode access terminal 114 is engaged in an active call having a lower priority than the newly attempted call, the multi-mode access terminal 114 is identified as a candidate transferring terminal. One or more candidate transferring terminals 114 are transferred to an alternate technology wireless network 106.

Any of numerous techniques, algorithms and parameters may be used to identify the transferring terminal 114. In order to identify the transferring terminal 114 in the exemplary embodiment, the controller 120 evaluates the capabilities and the current network conditions of at least some of the active access terminals 110, 112, 114, 116 engaged in calls having a lower priority level than the newly attempted call. In some cases, the controller 120 may target the active access terminal with the lowest priority level for transfer if more than two priority levels are supported. The terminal capabilities include the communication capabilities of the access terminal 110, 112, 114, 116 such as the types of wireless networks that can be accessed by the access terminal 110, 112, 114, 116. The network conditions include the current conditions observed by the access terminal related to the alternate technology wireless networks. Examples of network condition parameters include received signal strength indicators (RSSI) for alternate technology wireless networks 106. Other parameters may depend on whether the originating network can transfer the call to the alternate network without tearing down the call. For example, calls established over internet protocol (IP) may be more easily transferred than circuit switched calls. In some situations, the access terminal may provide its current location.

In addition to network conditions and access terminal capabilities, the identification of a candidate transfer terminal may be based on other system parameters. For example, the decision to select a particular access terminal for transfer may involve identifying any roaming agreements that the access terminal has with the other technology network and whether the alternate technology is able to provide similar service for the current application currently being used in the originating wireless network.

After the terminal capabilities and network condition parameters are obtained, the information is stored in the local memory 132 that can be accessed by the controller 120. The terminal capabilities may be maintained in a variety of locations and may be obtained using any of several techniques. For example, the terminal capabilities may be obtained from a database accessible by the controller 120 or may be obtained directly from the access terminal 110, 112, 114, 116. In some situations, the terminal capabilities may be maintained in the local memory connected to the controller 120 where the local memory may or may not be accessible by other controllers or network entities. In other circumstances, the controller 120 may access terminal capabilities by retrieving information from a network entity or sever that provides a repository of subscriber related data such as a home subscriber server (HSS), a home location register (HLR) in a circuit switched network, or an authentication, authorization and accounting (AAA) server in a packet data network. A HLR is typically connected to a MSC and an AAA is typically connected to a PDSN. Although the HLR or AAA may be connected to the network switch that is connected directly to the originating wireless network 102, the HLR and AAA may be connected in other locations within the communication system 100. Information related to the terminal capabilities may be retrieved by the controller 120 when an access terminal 112-116 registers on the originating wireless network 102, or when particular conditions are met depending on the particular implementation. Further, information related to access terminal capabilities may be obtained for only selected access terminals. For example, the controller 120 may request terminal capability information from all access terminals engaged in low priority calls when a capacity threshold indicates that the network resources in use are approaching a transfer threshold capacity. In the exemplary embodiment, the terminal capabilities are obtained from the access terminal at the time of registration as part of the registration process and are stored in a local subscriber memory 132. Other methods of obtaining the access terminal capabilities may include any combination of obtaining information from an HLR or AAA, local memory, or other sources.

The network conditions are stored in the memory 132 connected to the controller 120 and may be obtained or updated with information transmitted from the access terminals periodically, or when certain conditions are met, or may be requested from the access terminal by the controller 120 in the originating wireless network 102 when certain update conditions are detected by the originating wireless network 102. For example, update conditions related to the transfer threshold may be used to trigger an information updating procedure from at least some of the access terminals. In the exemplary embodiment, the controller requests the network conditions based on network conditions such as the remaining capacity in the originating wireless network and the rate that the conditions are changing which may be a result of the speed of the access terminals. In some situations, the controller 120 may request network conditions periodically.

In the exemplary embodiment, access terminals engaged in solely data communication in a lower priority call are identified as candidate transferring terminals. If none of the lower priority calls are data calls, the access terminals with normal priority voice calls that have capabilities to continue a voice call on an alternate technology wireless network are selected as the transferring terminal 114.

Figure 2:
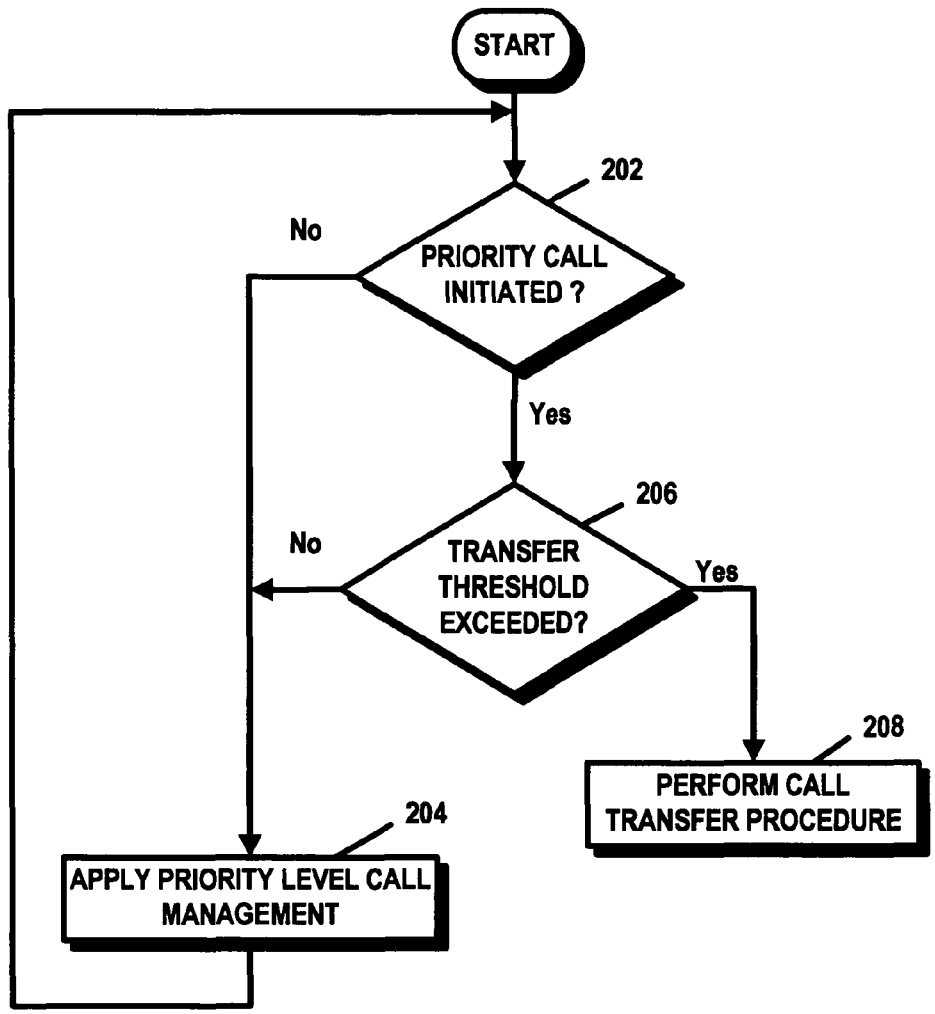
FIG. 2 is a flow chart of a method of priority call management in accordance with the exemplary embodiment of the invention.

FIG. 2 is flow chart of a method of managing a wireless network providing different priority levels of service in accordance with the exemplary embodiment of the invention. The steps discussed with reference to FIG. 2 may be performed by any combination of hardware, software, and/or firmware. In the exemplary embodiment, the method is at least partly performed by executing software code on a processor within a controller 120 of the originating wireless network 102. Equipment such as a BSC or ANC manages the calls within the originating wireless network 102 and transfers active calls from the originating wireless network 102 to one or more alternate technology wireless networks 106 based on the priority level of calls and the transfer threshold.

At step 202, it is determined whether a priority call has been initiated by an access terminal on the originating wireless network 102. If no priority call has been initiated, the method proceeds to step 204 where the priority level call management procedure is invoked. As discussed herein, a priority call is a call that has a priority level greater than a normal priority. Therefore, the originating wireless network 102 provides at least two levels of service to access terminals. The priority levels can be applied to any number of priority levels.

At step 204, no calls are transferred and the calls are managed in accordance with the priority level scheme where calls are placed in a queue based on the particular priority level.

At step 206, it is determined whether the transfer threshold has been exceeded. As discussed above, the transfer threshold is a trigger point that may be based on any number factors including the available capacity of the originating wireless network 102. In the exemplary embodiment, the transfer threshold is based on the capacity of the service area. The transfer threshold may be based on any number of factors, parameters, and measurements. Examples of other suitable parameters include changes in the number of users attempting to access the terminal, the number of total data users on the wireless network, the total number of voice users on the wireless network, and the ratio of data to voice communication traffic. As explained above, examples of suitable parameters in CDMA include rise over thermal in the reverse link for CDMA, available transmission power and the number of remaining Walsh codes that can be assigned to access terminals in the forward link. For TDMA based systems, the network parameters include the number of available slots to support new calls. If the transfer threshold is not exceeded, the method continues at step 204. Otherwise, the method proceeds to step 208.

At step 208, the call transfer procedure is performed. As described in further detail below with reference to FIG. 3, transferring terminal candidates are determined based on at least the terminal capabilities and network conditions. From the access terminals engaged in an active call in the originating wireless network 102, the candidate transferring terminals are identified as the multi-mode terminals 114 engaged in a lower priority call than the incoming priority call and that have reported network conditions allowing a transfer to an alternate technology wireless network 106. One or more of the active calls with the candidate transferring terminals are transferred to the alternate technology wireless network 106.

Therefore, an active call between a transferring access terminal and an originating wireless network 102 is transferred to the alternate technology wireless network 106 when the active call has a first priority level less than a second priority level of a another call attempted on the originating wireless network 102 by another access terminal. In the exemplary embodiment, the calls are transferred only when a transfer threshold in the originating wireless network 102 is exceeded.

Figure 3:
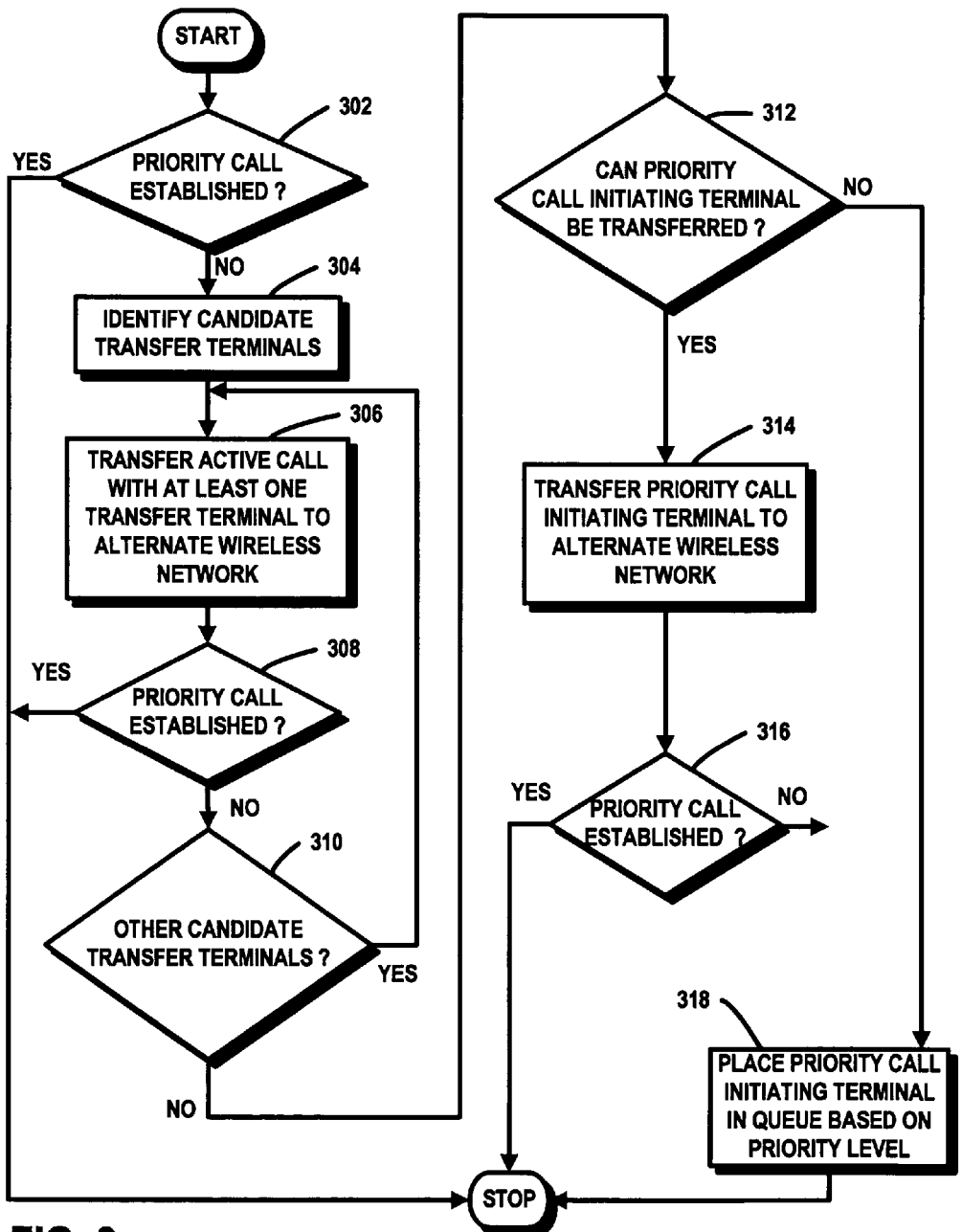
FIG. 3 is a flow chart of a method of performing a call transfer procedure in accordance with the exemplary embodiment of the invention.

FIG. 3 is a flow chart of a method of performing a call transfer procedure in accordance with the exemplary embodiment of the invention. Accordingly, the method described with reference to FIG. 3 provides a suitable technique for executing step 208 of FIG. 2.

At step 302, it is determined whether the priority call has been established. If the priority call has been established, the method is complete. Otherwise, the method continues at step 304.

At step 304, the candidate transferring terminals are identified. Any of several techniques may be used to identify all or some of the access terminals engaged in active calls that can be transferred to the alternate technology wireless network 106. The controller 120 identified multi-mode terminals (114) based on the terminal capabilities. The terminal capabilities may be obtained from a subscriber data base such as a HLR, AAA or HSS or may be obtained from the access terminals. The terminal capabilities may be obtained when the candidate terminals are identified or at another time such as during registration of the access terminal 110, 112, 114, 116 on the originating wireless network 102. The network conditions are examined to identify the multi-mode access terminals 114 engaged in a call that can be transferred to the alternate technology wireless network 106. Parameters such as RSSI and bit error rate (BER) corresponding to the alternate technology wireless network 106 are examined to determine which multi-mode access terminals have adequate service to continue active calls through the alternate technology wireless network 106.

At step 306, an active call of at least one access terminal 114 is transferred from the originating wireless network 102 to the alternate technology wireless network. The multi-mode access terminals 114 engaged in a lower priority call than the priority of the priority call attempt by the call initiator 116 and observing network conditions that are sufficient for transferring the lower priority call are transferred to the alternate technology wireless network 106.

At step 308, it is determined whether the priority call has been established. If the call has been established, the method is complete. Otherwise, the method continues at step 310.

At step 310, it is determined whether identified candidate transferring terminals that have not been transferred to the alternate technology wireless network 106 exist. If other candidate transferring terminals have been identified, the method return to step 306 where one or more of the candidate transferring terminals are transferred to the alternate technology wireless network 106. Otherwise, the method continues at step 312.

At step 312, it is determined if the priority call initiator 116 is capable of completing the priority call through an alternate technology wireless network 106. The controller 120 determines if the access terminal 116 has multi-mode capabilities and if network conditions are sufficient to support the priority call on the alternate technology wireless network 106. The controller 120 retrieves the terminal capability information from local memory 132, a data base, or from the access terminal 116. The controller 120 also retrieves the most current network conditions corresponding to the priority call initiating terminal 116 from memory or from the access terminal 116. If the priority call initiating access terminal 116 can be provided services adequate to establish the priority call by the alternate technology wireless network 106, the access terminal is directed to an alternate technology wireless network 106 at step 314. Otherwise, the method continues at step 318.

At step 316, it is determined if the priority call has been established on the alternate technology wireless network 106. In the exemplary embodiment, the controller 120 determines if a service connect message have been sent to the access terminal and the corresponding service connect completion message is received from the access terminal. If the priority call has been established, the method is completed. Otherwise, the method continues at step 318.

At step 318, the priority call initiating access terminal 116 is placed in a call queue based on the priority level of the priority call. The access terminal 116 call is tracked and established in accordance with the relative priority levels of other pending calls.

Clearly, other embodiments and modifications of this invention will occur readily to those of ordinary skill in the art in view of these teachings. The above description is illustrative and not restrictive. This invention is to be limited only by the following claims, which include all such embodiments and modifications when viewed in conjunction with the above specification and accompanying drawings. The scope of the invention should, therefore, be determined not with reference to the above description, but instead should be determined with reference to the appended claims along with their full scope of equivalents.

What is claimed is:

1. A method for managing calls, the method comprising:
   detecting a call attempt for a priority call on an originating wireless network by an access terminal;
   transferring, if the priority call has a higher priority than an active call, when a transfer threshold is exceeded, the active call between a transferring terminal and the originating wireless network to a first alternative technology wireless network in response to the detecting of the call attempt for the priority call, the active call having a first priority level, the priority call having a second priority level greater than the first priority level, wherein the transferring of the active call of the transferring terminal is performed also responsive to first network conditions pertaining to the first alternative technology network, the first network conditions reported by the transferring terminal to the originating wireless network;
   attempting to establish the priority call through the originating wireless network after the transferring of the active call to the first alternative technology wireless network;
   determining if the priority call has been established through the originating wireless network;
   if the priority call has not been established through the originating wireless network, determining if the access terminal has communication capabilities to support establishing the priority call on at least one of the first alternative technology wireless network and a second alternative technology wireless network, the determining being responsive to second network conditions reported by the access terminal to the originating wireless network, the second network conditions pertaining to the at least one of the first alternative technology wireless network and the second alternative technology wireless network; and
   transferring the priority call to the at least one of the first alternative technology wireless network and the second alternative technology wireless network, if the access terminal has the communication capabilities to support the establishing of the priority call on the at least one of the first alternative technology wireless network and the second alternative technology wireless network.

2. The method of claim 1, wherein the transfer threshold is based on a capacity of the originating wireless network.

3. The method of claim 1, further comprising:
   identifying the transferring terminal from a plurality of active access terminals based on terminal capabilities of the transferring terminal.

4. The method of claim 3, further comprising:
   retrieving the terminal capabilities from a database.

5. The method of claim 4, wherein the database is an authentication, authorization and accounting (AAA) server.

6. The method of claim 1, further comprising:
   identifying the transferring terminal from a plurality of active access terminals based on network conditions of each of the active access terminals of the plurality of active access terminals.

7. The method of claim 6, further comprising:
   obtaining the network conditions from at least one access terminal of the plurality of access terminals;
   storing the network conditions in memory of the at least one access terminal of the plurality of access terminals; and
   retrieving the network conditions from the memory before identifying the transferring terminal.

8. The method of claim 7, wherein the obtaining the network conditions comprises:
   requesting the network conditions from the at least one access terminal of the plurality of access terminals when update conditions related to the transfer threshold are detected.

9. A method for managing calls, the method comprising:
   detecting a call attempt for a priority call on an originating wireless network by an access terminal; and
   transferring, if the priority call has a higher priority than an active call, when a transfer threshold is exceeded, the active call between a transferring terminal of a plurality of candidate terminals and the originating wireless network to a first alternative technology wireless network in response to the detecting of the call attempt for the priority call, the active call having a first priority level, the priority call having a second priority level greater than the first priority level, wherein the transferring of the active call of the transferring terminal is performed also responsive to network conditions pertaining to the first alternative technology reported by the plurality of candidate terminals to the originating wireless network and wherein the transferring terminal is selected for the transferring as being the best candidate among the plurality of candidate terminals for continuing communication on the first alternative wireless network.

10. The method of claim 9, wherein the transfer threshold is based on a capacity of the originating wireless network.

11. The method of claim 9, further comprising:
    selecting the transferring terminal of the plurality of candidate terminals based on terminal capabilities of the plurality of candidate terminals; and
    retrieving the terminal capabilities from a database.

12. The method of claim 11, wherein the retrieving of the terminal capabilities from the database is performed by a controller.

13. The method of claim 9, further comprising:
    before the detecting of the call attempt for the priority call, obtaining terminal capabilities from at least one access terminal of a plurality of access terminals;
    storing the terminal capabilities in memory of the at least one access terminal of the plurality of access terminals; and
    retrieving the terminal capabilities from the memory before selecting the transferring terminal of the plurality of candidate terminals.

14. The method of claim 9, further comprising:
    obtaining the network conditions from at least one access terminal of a plurality of access terminals;

storing the network conditions in memory of the at least one access terminal of the plurality of access terminals; and retrieving the network conditions from the memory before selecting the transferring terminal of the plurality of candidate terminals.

15. The method of claim 14, wherein the obtaining the network conditions comprises:

requesting the network conditions from the at least one access terminal of the plurality of access terminals when update conditions related to the transfer threshold are detected.

16. A method for managing calls, the method comprising:

detecting a call attempt for a priority call on an originating wireless network by an access terminal;

transferring, if the priority call has a higher priority than an active call, when a transfer threshold is exceeded, the active call between a transferring terminal of a plurality of candidate terminals and the originating wireless network to a first alternative technology wireless network in response to the detecting of the call attempt for the priority call, the active call having a first priority level, the priority call having a second priority level greater than the first priority level, wherein the transferring of the active call of the transferring terminal is performed also responsive to network conditions pertaining to the first alternative technology wireless network reported by the plurality of candidate terminals to the originating wireless network and wherein the transferring terminal is selected for the transferring as being the best candidate among the plurality of candidate terminals for continuing communication on the first alternative wireless network based on the network conditions pertaining to first alternative wireless network reported by the plurality of candidate terminals to the originating wireless network; and attempting to establish the priority call through the originating wireless network after the transferring of the active call to the first alternative technology wireless network;

determining if the priority call has been established through the originating wireless network;

if the priority call has not been established through the originating wireless network, determining if the access terminal has communication capabilities to support establishing the priority call on at least one of the first alternative technology wireless network and a second alternative technology wireless network, the determining being responsive to second network conditions reported by the access terminal to the originating wireless network, the second network conditions pertaining to the at least one of the first alternative technology wireless network and the second alternative technology wireless network; and transferring the priority call to the at least one of the first alternative technology wireless network and the second alternative technology wireless network, if the access terminal has the communication capabilities to support the establishing of the priority call on the at least one of the first alternative technology wireless network and the second alternative technology wireless network.

17. The method of claim 16, wherein the transfer threshold is based on a capacity of the originating wireless network.

18. The method of claim 16, further comprising:

selecting the transferring terminal of the plurality of candidate terminals based on terminal capabilities of the plurality of candidate terminals.

19. The method of claim 18, further comprising:

retrieving the terminal capabilities from a database.

20. The method of claim 16, further comprising:

before the detecting of the call attempt for the priority call, obtaining terminal capabilities from at least one access terminal of a plurality of access terminals;

storing the terminal capabilities in memory of the at least one access terminal of the plurality of access terminals; and retrieving the terminal capabilities from the memory before selecting the transferring terminal of the plurality of candidate terminals.

* * * * *